United States Patent [19]

Kawai

[11] Patent Number: 4,478,491
[45] Date of Patent: Oct. 23, 1984

[54] FOCUS PRESETTING MECHANISM FOR A CAMERA LENS ASSEMBLY

[75] Inventor: Tohru Kawai, Kanagawa, Japan

[73] Assignee: Canon Kabushiki Kaisha, Tokyo, Japan

[21] Appl. No.: 583,788

[22] Filed: Feb. 29, 1984

Related U.S. Application Data

[63] Continuation of Ser. No. 274,309, Jun. 16, 1981, abandoned.

[30] Foreign Application Priority Data

Jun. 18, 1980 [JP] Japan .................................. 55-85350

[51] Int. Cl.³ .............................................. G02B 7/02
[52] U.S. Cl. .................................................... 350/255
[58] Field of Search .................. 350/252, 255; 354/195

[56] References Cited

U.S. PATENT DOCUMENTS

| | | | |
|---|---|---|---|
| 1,734,438 | 11/1929 | Koehler | 350/255 |
| 3,054,338 | 9/1962 | Ewald et al. | 350/255 |
| 4,166,675 | 9/1979 | Kanno | 350/252 |

Primary Examiner—F. L. Evans
Attorney, Agent, or Firm—Toren, McGeady and Stanger

[57] ABSTRACT

A focus presetting mechanism for a camera lens assembly including an annular member fitted on the outer diameter of the lens assembly and rotatable relative thereto about the optical axis thereof which may be clamped at a fixed angular position in order to establish a predetermined focusing point at which the focusing ring of the lens assembly may be stopped. Stop members operatively interposed between the annular member and the focusing ring enable the focusing ring to be repeatedly returned to a predetermined focused position when the annular member is maintained clamped at this position.

2 Claims, 4 Drawing Figures

FOCUS PRESETTING MECHANISM FOR A CAMERA LENS ASSEMBLY

This is a continuation of application Ser. No. 274,309, filed June 16, 1981, now abandoned.

The present invention relates generally to focus presetting devices for optical instruments and more particularly to a device for establishing a preset focusing position for a camera lens assembly.

In the utilization of a camera, a focusing operation must be effected prior to actuating the camera for effecting an exposure of the film. In a case where it is desired to photograph on successive frames of the film a scene which includes objects which do not all lie within the depth of field of the lens, it is necessary during the shooting of the scene to change the focusing position of the lens in order to bring into focus a plurality of the different objects contained within the scene. In a case where the same object is to be recurrently photographed by frequent exposure of the film, it would be highly advantageous to provide means which would enable the photographer to quickly set the focused position of the focusing ring to focus on the desired object without the necessity for viewing of the object through the distance scale or through the viewfinder of the camera in order to assess the in-focus condition of the lens. Such a capability would increase the convenience with which the camera may be operated, it would enhance the quickness and ease of operation of the lens assembly and it would provide the capability for avoiding lost opportunities to photograph objects which must be quickly photographed.

With long or telephoto lenses having heavy weight and mounted in a barrel having a larger diameter, since the movable focusing member is also large in size and heavy in weight, it is required that a presetting focusing mechanism be capable of steady operation particularly where it is desired to avoid accidental shift of the preset value as the focusing member arrives at the focused position at which a shock or impact may be produced.

Accordingly, the present invention is directed toward providing a focusing presetting device which is capable of quickly accomplishing a presetting operation of the focusing ring of a lens assembly and which assures accurate performance of the presetting operation. The invention is further directed toward provision of a presetting device which may be successfully applied with a long or telephoto lens assembly or other similar device having a focusing member which is large in diameter and heavy in weight, the invention operating to avoid accidental shift of the preset focusing value which may be caused due to the weight and size of the moving parts of the lens assembly.

SUMMARY OF THE INVENTION

Briefly, the present invention may be described as a focus presetting mechanism for a camera lens assembly including a focusing ring for said lens assembly comprising an annular member fitted on the outer diameter of the lens assembly and rotatable relative thereto about the optical axis thereof, a distance scale displayed on the annular member, clamping means for fixedly securing said annular member at a desired angular position on said lens assembly, and stop means operatively interposed between the annular member and the focusing ring for stopping rotation of the focusing ring at an angular position determined by the fixed angular position of the annular member.

The mechanism may be provided with index means adapted to have the distance scale on the annular member aligned therewith in order to establish the fixed angular position at which the annular member is secured by the clamping means, thereby enabling a particular focusing distance to be determined.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 3:
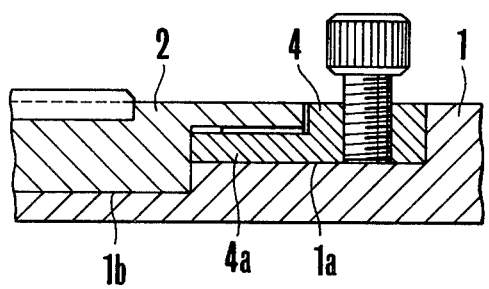
FIG. 3 is a sectional view showing in greater detail the principal parts of the presetting mechanism of the invention.
Figure 4:
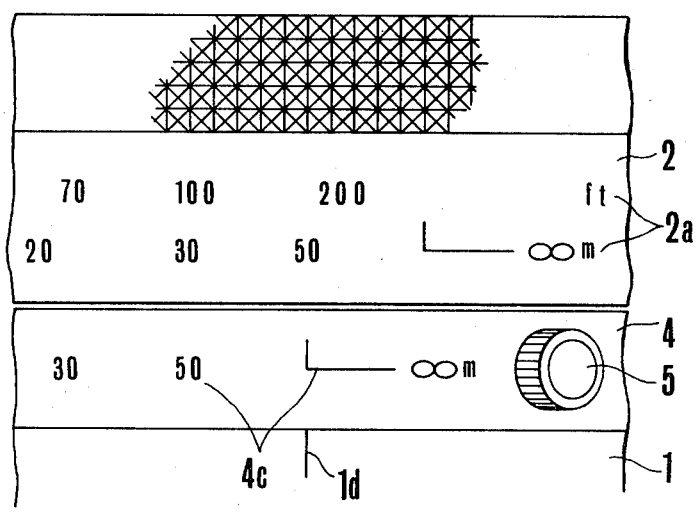
FIG. 4 is a side view of the outer periphery of the lens mounting assembly embodying the invention.

Referring now to the drawings, wherein similar reference characters are used to refer to like parts throughout the various figures thereof, there is shown a lens assembly which embodies the present invention and which includes a stationary barrel 1 having two stepped portions 1a and 1b formed with a greater or lesser thickness, respectively, as better illustrated in FIG. 3.

On the thinner portion 1b of the stationary barrel 1 there is fitted a distance adjusting or focusing ring 2 which is rotatable about the optical axis of the lens assembly and which is connected to drive the optical components (not shown) of the lens assembly in order to effect axial movement thereof for focusing of the lens assembly, in a manner known to those skilled in the art.

On the outer peripheral surface of the focusing ring 2 there is provided a distance or focusing scale 2a which may be represented both in meters and in feet. A main body 3 of the outer barrel which is provided at the rear end thereof with coupling means (not shown) for attachment of the lens assembly to the body of a camera or other similar optical instrument (not shown) is provided on the lens assembly.

In accordance with the present invention, the lens assembly is provided with a focus presetting ring 4 which is fitted on the thicker portion 1a of the stationary barrel 1. A rotation stopping portion 4a extends axially from the focus presetting ring 4. A rotation stopping 1c is affixed to the thicker portion 1a of the stationary barrel 1.

Figure 1:
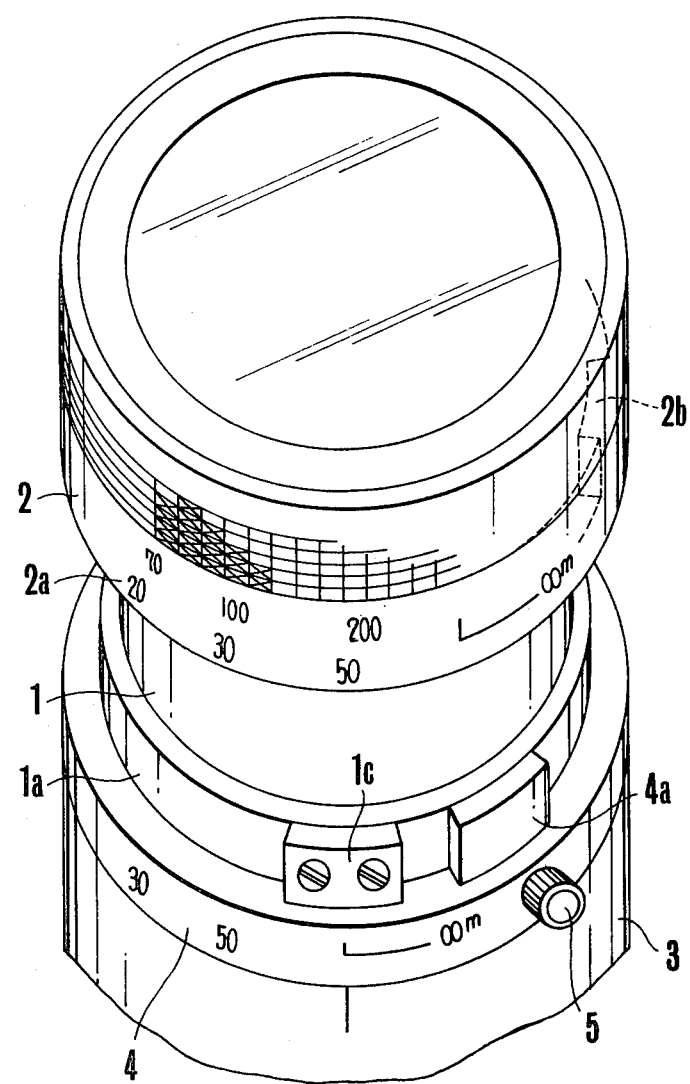
FIG. 1 is an exploded perspective view showing a mechanism in accordance with the invention.
Figure 2:
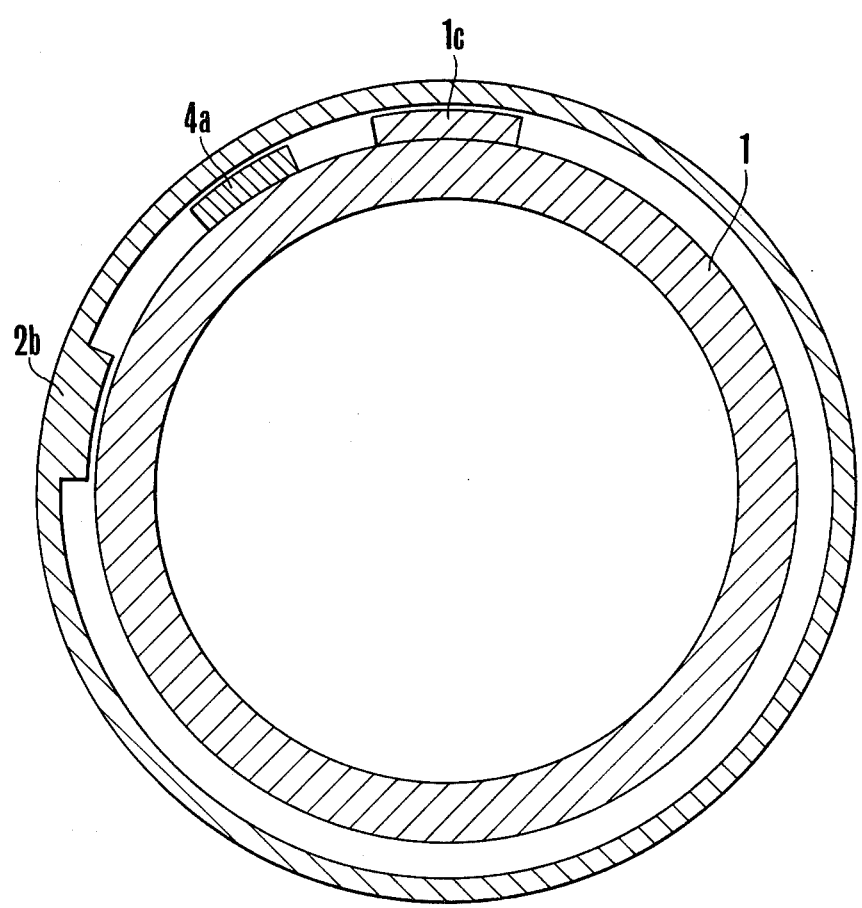
FIG. 2 is a transverse sectional view showing the mechanism of the invention in assembled operative form.

Projecting from the inner peripheral surface of the focusing ring 2 there is provided a rotation stopping portion 2b. The rotation stopping portions 1c, 2b, and 4a are arranged so as to be in almost equal axial positions on the lens barrel, as best seen in FIG. 2.

A setscrew 5 is provided for fixedly securing the annular focus presetting ring 4 at a predetermined fixed angular position on the stationary barrel 1. When the setscrew 5 is loosened, the presetting ring 4 will be freely rotatable relative to the stationary barrel 1. When the screw 5 is tightened, the annular presetting ring ring 4 will be held at a fixed stationary position on the stationary barrel 1.

The outer peripherial surface of the annular focus presetting ring 4 has displayed thereon a distance scale 4c which is equivalent to the distance or focusing scale 2a provided on the focusing ring 2.

In the operation of the focus presetting device of the invention, when it is desired to effect camera exposure in the normal mode with the setscrew 5 in the loosened condition, the operator will be capable of rotating the focusing ring 2 over its entire focusing range so that the lens of the mounting assembly may be focused on any object at any distance as the optical components of the lens assembly are moved axially relative to the stationary barrel 1.

When it is desired to effect recurrent exposure of a particular object at a specific distance, for example 50 m, the operator may rotate the focus presetting ring 4 in order to place one of the graduations of the distance scale 4c in registry with an index 1d. When this registry has been accomplished, the setscrew 5 is tightened and the focus presetting ring 4 will be maintained in the set position.

During this time, the focus ring 2 may be rotated to focus on an object at a distance other than the focusing distance set on the ring 4. When it is again desired to photograph the same object at the 50 m, the operator need only rotate the focusing ring 2 until it is stopped at the desired focused position. This will occur when the stopping means 2b on the focusing ring 2 is brought into abutment with the stopping means 4a on the annular focus presetting ring 4. As a result, the lens assembly will be automatically focused to the desired distance.

The provision of the distance scale 4c on the outer peripheral surface of the annular focus presetting ring 4 assists in recognizing at a glance the value of the focusing distance which is preset.

Furthermore, when the axial separation between the focusing ring 2 and the annular focus presetting ring 4 is large, the provision of the distance scale on the focus presetting ring 4 is also advantageous in preventing misreading of the actual focus distance value cooperative with the index 1d.

While a specific embodiment of the invention has been shown and described in detail to illustrate the application of the inventive principles, it will be understood that the invention may be embodied otherwise without departing from such principles.

What is claimed is:

1. A focus presetting mechanism for a camera lens assembly including a focusing lens member comprising:
   (a) a stationary barrel having a fixed index mark on the outer periphery thereof for distance adjustment, said stationary barrel having a first rotation stopping portion provided thereon;
   (b) a focusing ring for shifting said focusing lens member along the optical axis of said lens assembly, said focusing ring having a second rotation stopping portion engageable with said first rotation stopping portion of the stationary barrel and having a distance scale on the outer periphery thereof;
   (c) focus presetting means having a focus presetting ring and a tightening member, said focus presetting ring being inserted rotatably about the optical axis between said stationary barrel and said focusing ring and being provided on its outer periphery a distance scale of the same magnitude as that of said distance scale of said focusing ring in side-by-side relation with said distance scale; and
   (d) a third rotation stopping portion on said focus presetting ring engageable with said second rotation stopping portion, said tightening member being settable in loosened and tightened conditions and operating such that when in said loosened condition it sets said focus presetting ring in a freely rotatable manner so as to enable performance of a focus adjustment without restriction by said third rotation stopping portion of said focus presetting ring, and when in said tightened condition it fixed said third rotation stopping portion of said focus presetting ring at any desired distance position so as to set a distance adjusting zone of said focusing ring between said first rotation stopping portion and said third rotation stopping portion.

2. A focus presetting mechanism for a camera lens including a focusing lens member comprising:
   a stationary barrel having a fixed index mark on the outer periphery thereof for enabling distance adjustment and having a first rotation stop member affixed thereto;
   a focusing ring rotatable relative to said stationary barrel for enabling focusing of said focusing lens member, said focusing ring having a second rotation stop member arranged to move in a circumferential path along which it will abut said first rotation stop member on said stationary barrel;
   a first distance scale on the outer periphery of said focusing ring to enable setting thereof at a specific position to determine focusing of said focusing lens member;
   a focus presetting ring rotatably mounted on said stationary barrel and freely rotatable relative thereto;
   a second distance adjusting scale on said focus presetting ring which corresponds to said first distance scale on said forcusing ring;
   a third rotation stop member affixed to said focus presetting ring and arranged upon rotation of said focus presetting ring to traverse a circumferential path wherein it will be brought into abutment with said first and said second rotation stop members; and
   a tightening member on said focus presetting ring adapted to be placed in a loosensed condition to enable said focus presetting ring to be freely rotated about said stationary barrel and in a tightened condition to fix said focus presetting ring on said stationary barrel;
   said focusing ring being freely rotatable about said stationary barrel to enable focus adjustment of said focusing lens member without restriction by said third rotation stop member when said tightening member is in said loosened condition.

* * * * *